United States Patent [19]

Gasseling et al.

[11] Patent Number: 5,416,654
[45] Date of Patent: May 16, 1995

[54] METHOD AND DEVICE FOR SNAP OPENING OF A COVER OF A CASSETTE

[75] Inventors: Gerardus F. M. Gasseling; Johannes M. M. Hensing; Karel G. M. Koken; Robertus J. M. Verhoeven, all of Eindhoven, Netherlands

[73] Assignee: U.S. Philips Corporation, New York, N.Y.

[21] Appl. No.: 90,582

[22] Filed: Jul. 13, 1993

[30] Foreign Application Priority Data

Jul. 14, 1992 [EP] European Pat. Off. ............ 92202153

[51] Int. Cl.6 ............................................. G11B 5/016
[52] U.S. Cl. ................... 360/99.02; 360/99.06
[58] Field of Search ..................... 360/99.02, 99.06

[56] References Cited

U.S. PATENT DOCUMENTS

| 4,899,238 | 2/1990 | Inoue et al. | |
|---|---|---|---|
| 5,005,093 | 4/1991 | Inoue et al. | 360/99.06 |
| 5,123,004 | 6/1992 | Arai | |
| 5,124,975 | 6/1992 | Naoki et al. | 360/99.06 |
| 5,153,867 | 10/1992 | Inoue | 360/99.06 |

FOREIGN PATENT DOCUMENTS

| 0157588 | 10/1985 | European Pat. Off. |
| 0348937 | 1/1990 | European Pat. Off. |
| 0447248 | 9/1991 | European Pat. Off. |

*Primary Examiner*—A. J. Heinz
*Attorney, Agent, or Firm*—David R. Treacy

[57] ABSTRACT

A device for the recording and reproduction of signals on a cassette for a medium comprising a sliding cover which in the device can be moved between a closed position and an open position. The device has a receiving space into which the cassette can be inserted, after which by means of a pivotal lever the sliding cover is opened upon further insertion of the cassette, in that the lever moves from the first position to the second position and thereby moves the sliding cover from a closed position to an open position. The lever is arranged on a movable lever support which can be moved between a starting position and an end position. The sliding cover is opened by snap action.

13 Claims, 5 Drawing Sheets

METHOD AND DEVICE FOR SNAP OPENING OF A COVER OF A CASSETTE

BACKGROUND OF THE INVENTION

The invention relates to a device for scanning, and more particularly for recording/reproduction of signals on/from, a medium in a cassette provided with a sliding cover which is movable between a closed position and an open position, which device has a receiving space adapted to receive the cassette, a lever which is pivotable about a pivot between a first an a second position and which during insertion contacts the cassette at or near a free end and upon further insertion pivots from the first to the second position and thus moves the sliding cover from the closed position to the open position, and lever urging means which urge the lever towards the first position.

It is known (EP 0,157,588 A2, herewith incorporated by reference) to use a device of the type defined in the opening paragraph in combination with cassettes provided with a disc-shaped magnetic medium. In the device described therein and in other similar devices for magnetic, optical or magneto-optical media the lever first opens the sliding cover. After this the medium and a turntable for the rotary drive of the medium are moved towards one another by axially moving the cassette inside the device by means of a mechanism provided for this purpose. At the same time the medium and the pick-up(s) provided for recording and reproduction are moved towards one another. The volume required for moving the medium and the turntable towards one another inside the device is approximately equal to the product of the width of the cassette, the length of the insertion path and the magnitude of the relative movement between the medium and the turntable. This volume cannot be utilised for other purposes, which has an adverse effect on the overall thickness of the device. Moreover, a comparatively intricate mechanism is needed for said axial movement of the cassette and the movement of the optical and/or magnetic pick-up(s).

SUMMARY OF THE INVENTION

It is an object of the invention among others to provide a device of the type defined in the opening paragraph having a small volume and comprising a simple mechanism. To this end the device in accordance with the invention is characterised in that the lever is arranged on a lever support which is movable between a starting position and an end position.

The advantage of the invention is that the movement of the lever is no longer limited to merely a pivotal movement. A combination of movements enables the sliding cover to be opened more rapidly by the lever. As a result of this, the sliding cover can be fully opened at an earlier stage during loading, so that the sliding cover does not form an obstacle for parts of the device which have been provided to cooperate with the medium. In this respect it is to be noted that for practical reasons it is important that an embodiment of the invention is used which is characterized in that opening of the sliding cover only commences after the cassette has been introduced so far into the device that at least the sliding cover is situated within the device. If the sliding cover is opened at an earlier stage the surface of the medium may be damaged or soiled. Therefore, opening of the sliding cover should not begin until it is inside the device. The invention is based on the recognition of the fact that an advantageous device of small volume can be obtained by having the lever make a combined movement, so that the sliding cover can be opened rapidly with a small displacement of the cassette in the insertion direction and it is possible to dispense with a mechanism for axially moving the cassette inside the device.

An advantageous embodiment of the invention is characterised in that further urging means are provided to urge the lever support towards the starting position. This step ensures that only simple means are needed to return the lever support to the starting position.

A further embodiment of the invention is characterised in that as it moves from the first to the second position the lever passes a point beyond which it is pivoted towards the second position with a snap action. This embodiment uses a snap action which causes the lever to suddenly perform an additional pivotal movement which is substantially larger than that corresponding to the path traversed by the cassette. This assists in the sliding cover being opened rapidly with a comparatively small displacement of the cassette. In this respect a further embodiment of the invention is favourable, which is characterised in that the pivotal movement of the lever upon passing said point corresponds at least substantially to the distance to be covered by the sliding cover in order to reach the open position.

A further embodiment of the invention is characterised in that the lever urging means comprise a spring arranged around the pivot. This step leads to a space-saving arrangement of the urging means. Use can be made of, for example, a torsion spring or a so-called omega spring.

An embodiment of the invention which has proved to be satisfactory in practice is characterised in that the receiving space is bounded by a wall, said wall has an opening, the wall portions which bound the opening have guide surfaces for guiding the lever, the lever is situated substantially inside the receiving space, the lever support comprises a sliding block which is movable at least partly inside the receiving space, and the further urging means comprise a tension spring arranged adjacent the receiving space.

An advantage of the provision of the guide surfaces is that in the first position the lever can extend parallel to the direction of insertion of the cassette. During insertion the cassette is not blocked because the guide profile causes the lever to be pivoted sideways. In this way it is achieved that the most favourable part of the pivotal-movement/sliding-movement characteristic of the lever is used (i.e. the largest ratio of cover displacement per unit of pivotal movement of the lever) when opening of the sliding cover of the cassette begins.

A further embodiment of the invention is characterised in that measured transversely of the direction of insertion of the cassette and transversely of the sliding direction of sliding cover the device has a height dimension not in excess of one inch. A highly advantageous embodiment is characterized in that the device fits within the standard form factor for 3.5" floppy disc drives ($4'' \times 1'' \times 6'' = 101.6 \times 25.4 \times \approx 150$ mm.). The principal advantage of this embodiment is that the device may be accommodated in the space made available, for example, by manufacturers of personal computers for the incorporation of magnetic disk drives.

The invention also relates to a method of moving a sliding cover of a cassette, the method comprising the insertion of the cassette into a receiving space of a device, which cassette then enters into contact with a lever which is pivotable about a pivot between a first position and a second position, and subsequently the further insertion of the cassette, thereby causing the lever near its free end to move the sliding cover from a closed to an open position. This method is known from the use of devices of the type mentioned hereinbefore. As already stated, the drawback of the known method is that the sliding cover is opened only at a comparatively late stage, so that movements requiring additional space have to be performed inside the device in order to prevent the sliding cover from coming into contact with the turntable or other parts during insertion.

The object of the method in accordance with the invention is to open the sliding cover already at an early stage so that an axial movement of the cassette inside the apparatus may not be required, and the method is characterised in that during insertion of the cassette the pivot is moved from a starting position to an end position. By means of this method combined movements are possible which cause the sliding cover to be opened more rapidly than with a mere pivotal movement.

An embodiment of the method in accordance with the invention is characterised in that during insertion of the cassette the lever initially pivots gradually into a critical position of equilibrium, after which the lever experiences an abrupt further pivotal movement simultaneously with an abrupt further movement of the sliding cover into at least substantially the open position. The snap-action all at once provides a comparatively large additional displacement of the sliding cover.

A further embodiment of the method in accordance with the invention is characterised in that the lever is supported on a lever support which is movable between a starting position and an end position and which during the abrupt further pivotal movement of the lever enters into contact with the cassette, and during further insertion the cassette, the lever and the lever support are jointly moved further into the end position of the lever support. The use of this embodiment provides a favourable coordination of the various movements, which movements are controlled by the cassette itself.

The invention will now be described in more detail, by way of illustration only, with reference to the drawings relating to a possible embodiment to which the invention is not limited.

DESCRIPTION OF THE PREFERRED EMBODIMENT

Figure 1:
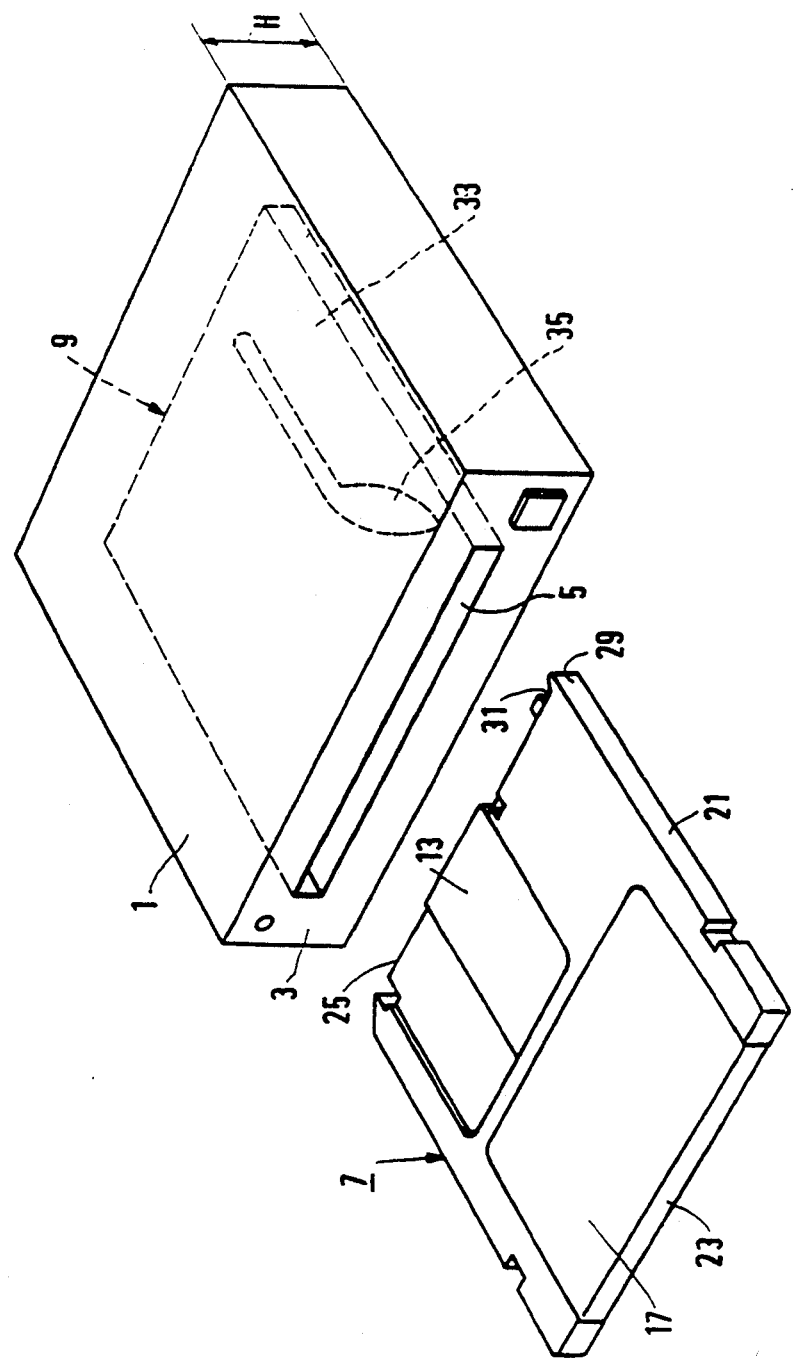
FIG. 1 is perspective view of a device and a cassette to be inserted therein, which cassette accommodates a disc-shaped medium.
Figure 2:
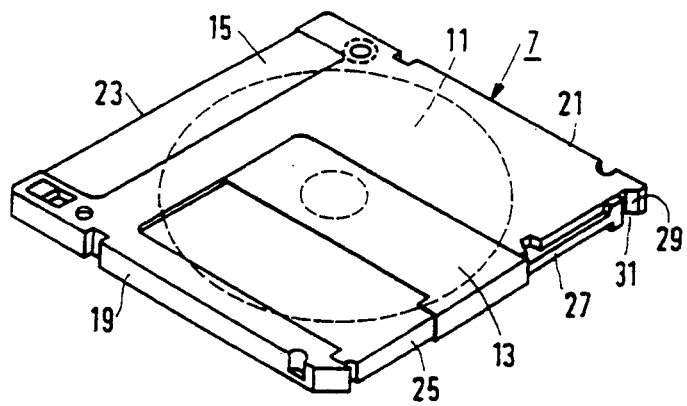
FIG. 2 is a perspective plan view of the cassette shown in FIG. 1.
Figure 3:
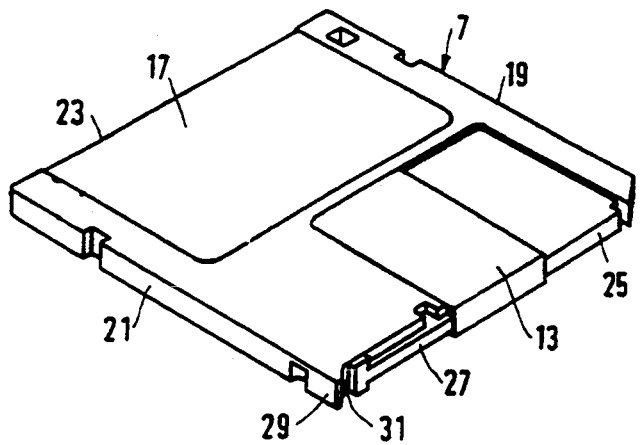
FIG. 3 is a perspective underneath view of the cassette shown in FIG. 2, FIGS. 4 to 9 are diagrammatic plan views showing the cassette and a part of the device for inserting and subsequently removing the cassette into/from the receiving space at various stages.

FIG. 1 shows highly diagrammatically a device 1 for the magneto-optical recording and reproduction of signals. The device is primarily intended for recording and reproducing computer data and is suitable for incorporation into a computer, for example a personal computer. The device has a front panel 3 with a slot 5 for the entry of a cassette 7. The device 1 has a receiving space 9 for the cassette 7, of which only the outlines are shown in broken lines. Some further parts of the device 1 will later be described in more detail with reference to FIGS. 4 to 9.

The cassette 7 accommodates a disc-shaped magneto-optical medium 11. Such a medium is known per se (see for example EP 0,348,937 A2) and will not be described any further because it is not relevant in the description of the inventive principle. The cassette has a sliding cover 13 which is movable between a closed position and an open position. The cassette further comprises an enclosure having main walls 15 and 17, side walls 19 and 21, a rear wall 23 and a front wall 25. The sliding cover 13 is secured to a sliding member 27 which together with the sliding cover 13 is slidable along the front wall 25 against spring force. Near the front wall 25 the side wall 21 has a peg-like slightly projecting portion 29 situated adjacent a recess 31 in the front wall 25. Further details of the cassette 7 will not be described because they are not relevant to the invention.

The process during insertion of the cassette into the device will now be described with reference to FIGS. 4 to 9.

Figure 4:
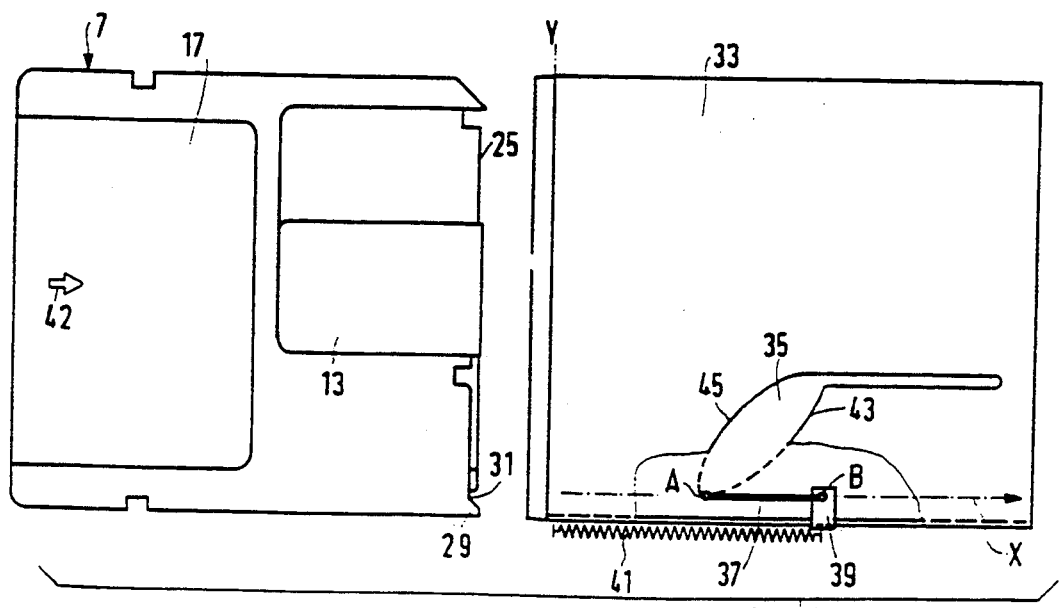
Figure 5:
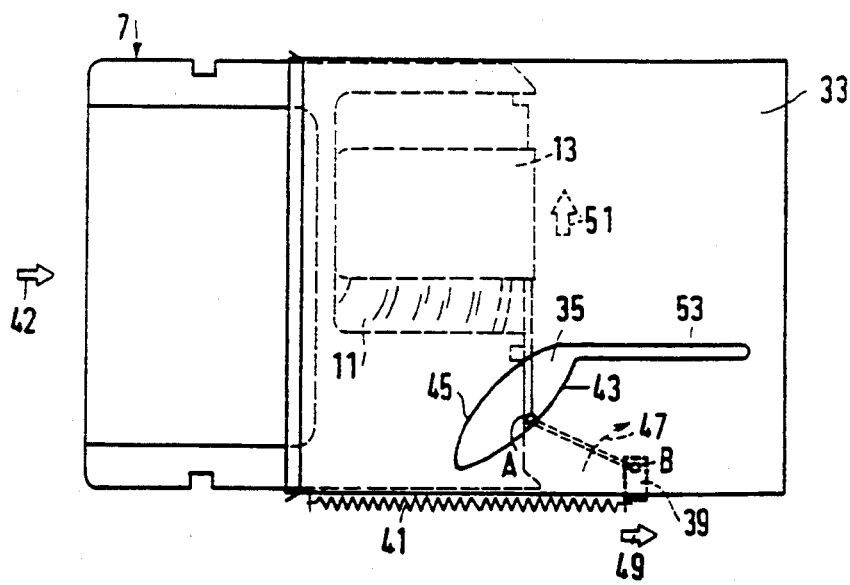

In the embodiment of the invention shown in FIG. 4 the receiving space 9 of the device is bounded at the upper side by a wall 33. The wall has an opening 35 whose shape is of importance for the present embodiment of the invention. A lever 37 having a free end A has been provided for opening the sliding cover 13. The lever is pivotable about a pivot through the other end B. The lever is pivotable between a first position shown in FIG. 4 and a second position shown in FIGS. 6 to 8. During the pivotal movement from the first position to the second position the sliding cover 13 is moved from the closed position shown in FIG. 4 to the open position shown in FIGS. 6 to 8. A spring 38, shown diagrammatically in FIG. 6, constantly urges the lever 37 elastically towards its first position. At the end B the lever is pivotally mounted on a lever support 39. In the present embodiment the lever support is constructed as a sliding block which is movable mainly inside the receiving space 9. The sliding block 39 is movable in a slot in a side wall of the receiving space 9, which wall adjoins the wall 33. The lever 37 is situated substantially inside the receiving space 9. The sliding block 39 is movable between a starting position, see FIG. 4, and an end position, see FIG. 7. Outside the receiving space further urging means in the form of a tension spring 41 have been provided for the sliding block, which spring pulls the sliding block towards the starting position. As will be described in more detail hereinafter the lever 37, as it moves from the first position to the second position, passes a point beyond which it is pivoted towards the second position with a snap action. This point is passed when the cassette is in a position situated between the positions shown in FIGS. 5 and 6. The pivotal movement produced by the snap action substantially corresponds to the distance still to be covered by the sliding cover 13 before it reaches the open position.

The invention makes it possible to construct an embodiment whose height dimension H, see FIG. 1, is one inch. More particularly the invention makes it possible to provide an embodiment within the 4"×1"×approx.

6" form factor of the standard Personal Computer 3.5" magnetic floppy disk drives used extensively in the PC industry.

When the cassette 7 is inserted into the receiving space of the device in the direction indicated by an arrow 42, see FIG. 4, the front wall 25 of the cassette will at a given instant contact the free end A of the lever 37 at the location of the recess 31. The opening 35 in the wall 33 of the receiving space is bounded by wall portions forming guide surfaces 43 and 45 for guiding the lever. When the cassette is moved further inward, see FIG. 5, this results in the free end A of the lever 37 following the guide surface 43, causing the lever to be pivoted about the end B in the direction indicated by an arrow 47. At the same time the sliding block 39 moves in the direction indicated by an arrow 49. The sliding cover 13 moves in the direction indicated by an arrow 51 and is consequently opened. When the cassette is moved further in the direction indicated by the arrow 42 a point is reached which is situated between the situations illustrated in FIGS. 5 and 6 and where the interplay of forces is such that beyond this point the free end A of the lever 37 snaps towards the open position. The snap action releases energy which has been stored in the spring 41 during the insertion movement to move the sliding cover towards its open position. As a result of this, the sliding cover 13 is fully opened, see the situation shown in FIG. 6. At the point where the snap action occurs three forces act upon the lever. In the first place there is the spring force which urges the sliding cover 13 towards its closed position. Secondly, there is the spring force which urges the lever 37 towards its first position. In the third place there is the tension provided by the spring 41. During the snap action the sliding block 39 at once jumps back from approximately the position shown in FIG. 5 to a position nearer that shown in FIG. 6. The free end A of the lever jumps from the guide surface 43 towards the facing guide surface 45.

Figure 6:
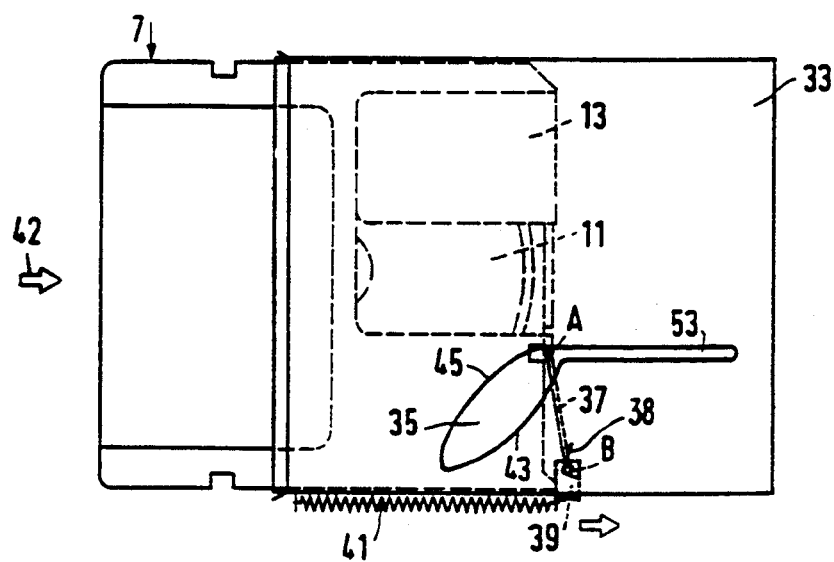
Figure 7:
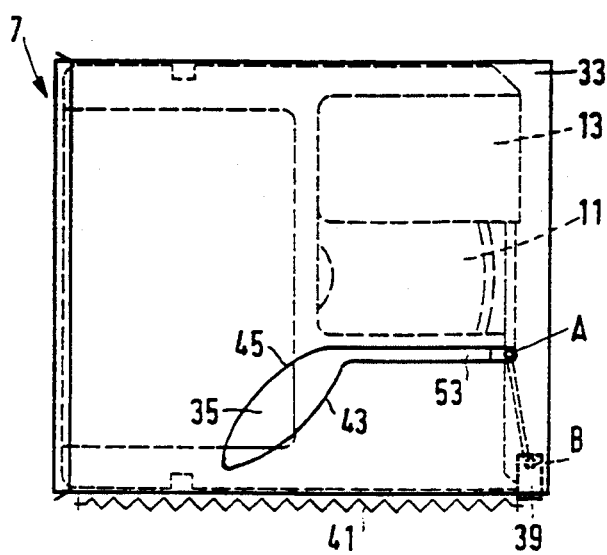
Figure 8:
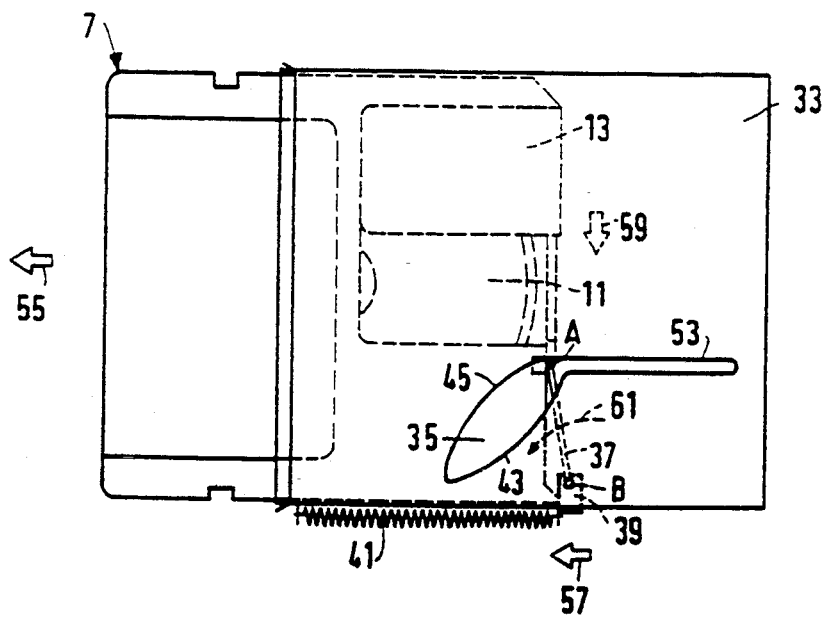
Figure 9:
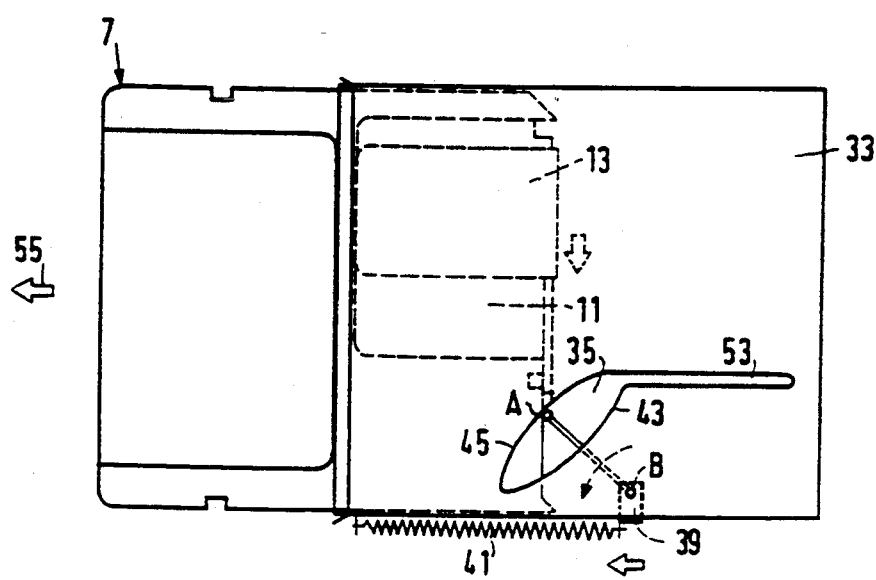

After the situation shown in FIG. 6 has been reached and the cassette is inserted further the free end A follows a slotted portion 53 of the opening 35 until the final position shown in FIG. 7 is reached. When the cassette is subsequently removed from the receiving space in the direction indicated by an arrow 55, see FIG. 8, the free end A returns through the slot 53, after which it follows the guide wall 45, see FIG. 9. The tension spring 41 together with the lever urging means and the resilient means loading the sliding cover 13 of the cassette cooperate to produce a force for ejecting the cassette. The sliding block 39 and the sliding cover 13 move in the directions 57 and 59 respectively. The lever 37 pivots back as indicated by an arrow 61.

Figure 10:
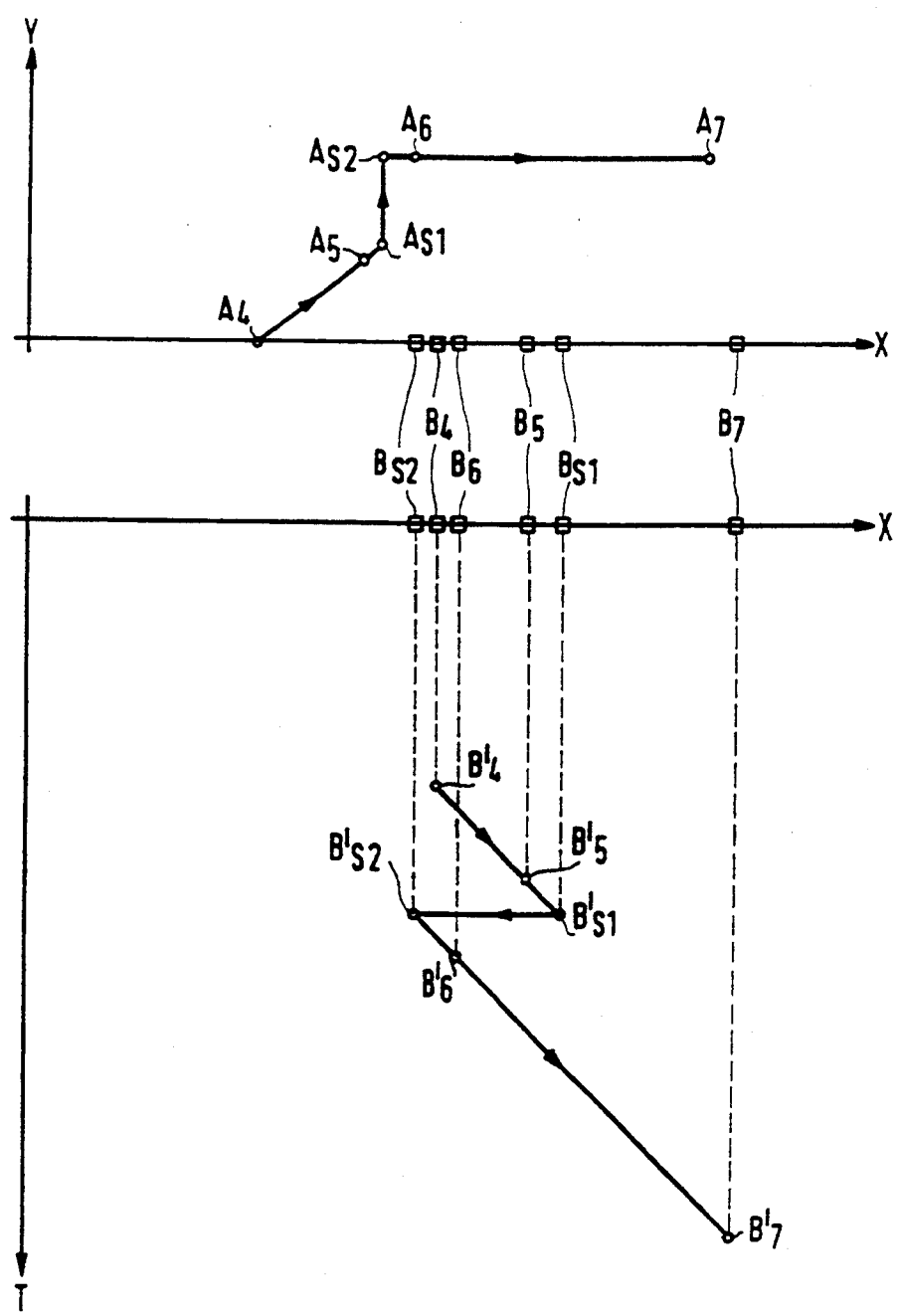
FIG. 10 is a graph representing the movements of the cassette, the sliding cover and the lever support in relation to the various stages in FIGS. 4 to 9.

FIG. 4 shows an XY system of coordinates having an X-axis passing through the two ends A and B of the lever 37 in the position occupied in FIG. 4. This system is again shown in FIG. 10. The points A4, A5, A6 and A7 represent the positions of the end point A of the lever 37 as shown in FIGS. 4 to 7. Between the points A5 and A6 the lever end A suddenly jumps with a snap action from a point AS1 to a point AS2. The point AS2 has the same Y coordinate as the points A6 and A7, so that in the point AS2 the sliding cover 13 of the cassette is fully open. The lower part of FIG. 10 shows the X-axis and a time axis T extending downward perpendicularly thereto. The graph represents the displacement of the sliding block and hence of the point B when the cassette is inserted with a uniform velocity. The lower part of the graph shows that between the points B5 and B6 the sliding block suddenly jumps from a point BS1 to a point BS2.

Although the invention has been described with reference to the drawings this does not imply that the invention is limited to the embodiments shown in the drawings. The invention likewise relates to all embodiments which deviate from those shown in the drawings but which remain within the scope defined by the Claims and which utilise the basic idea of the invention, which entails that the lever is not pivoted about a fixed point but has a movable pivot. This enables combined movements of both ends of the lever to be realised and in particular enables a construction whose special feature is that at a given instant an equilibrium of forces becomes unbalanced, as a result of which the lever discontinuously pivots through an additional angle. The sliding cover then suddenly moves from a partly to a fully open position.

In contradistinction to what is shown in the drawings it is possible, for example, to provide a device for a medium in the form of a tape instead of a disc-shaped medium. The lever support may be moved by means of a separate mechanism, which may be motor driven. Instead of springs other urging means may be used (electrical, magnetic, pneumatic etc.). Loading the cassette into the devices may be effected wholly or partly by means of a motor drive. Instead of a simple pin in hole pivot B, other pivoting means may be used such as a plastics integrated pivot or crossed leaf springs, etc.

Further advantages of the invention which have not yet been mentioned may be obtained depending on the embodiment used and the field of use. Moreover, further advantages may become apparent upon comparison of the invention with prior art other than cited herein.

We claim:

1. A device for scanning a medium in a cassette having a sliding cover which is movable between a closed position and an open position, said device having a receiving space for receiving the cassette, and comprising:
    a pivot,
    a lever which is pivotable about said pivot between a first and a second position, arranged to contact said cassette during insertion at or near a free end of the cassette, and upon further insertion to pivot from said first position to said second position for moving said sliding cover from the closed position to the open position,
    a lever support which is movable between a starting position and an end position, said pivot being arranged on said lever support,
    first biasing means arranged on and movable with said support for urging said lever to pivot toward said first position, and
    second biasing means for urging said support toward its starting position,
    said lever support being arranged such that opening of the sliding cover commences only after the cassette has been introduced into the device such a distance that the entire sliding cover is situated within the device.

2. A device as claimed in claim 1, wherein said receiving space is bounded by a wall having an opening, characterized in that the opening is bounded by wall portions having guide surfaces formed therein for guiding said lever, said lever is disposed substantially inside the receiving space,
said lever support comprises a sliding block arranged to be movable at least partly inside the receiving space, and
said second biasing means comprises a tension spring arranged adjacent the receiving space.

3. A device as claimed in claim 2, characterized in that the device fits within the standard form factor for 3.5" floppy disc drives ($4'' \times 1'' \times \approx 6'' = 101.6 \times 25.4 \times \approx 150$ mm.)

4. A device as claimed in claim 1, characterised in that measured transversely of the direction (42) of insertion of the cassette (7) and transversely of the sliding direction (51) of sliding cover the device (1) has a height dimension (H) greater than zero and not in excess of one inch.

5. A device as claimed in claim 1, characterized in that said first biasing means comprises a spring arranged around said pivot.

6. A device for scanning a medium in a cassette having a sliding cover which is movable between a closed position and an open position, said device having a receiving space for receiving the cassette, and comprising:
a pivot,
a lever which is pivotable about said pivot between a first and a second position, arranged to contact said cassette during insertion at or near a free end of the cassette, and upon further insertion to pivot from said first position to said second position for moving said sliding cover from the closed position to the open position, and
means for urging the lever towards said first position, characterized in that said pivot is arranged on a lever support which is movable between a starting position and an end position, said lever and lever support being arranged such that, as the lever moves from the first to the second position the lever passes a point beyond which it pivots toward the second position with a snap action, wherein during said snap action the lever pivots through a movement which is substantially larger than that corresponding to the movement of the cassette.

7. A device as claimed in claim 6, characterized in that said lever and lever support are arranged such that movement of said lever after passing said point corresponds substantially to the distance to be traveled by the sliding cover to reach the open position.

8. A device as claimed in claim 6, characterized by comprising further means for urging said lever support towards the starting position.

9. A device as claimed in claim 8, wherein said receiving space is bounded by a wall having an opening, characterized in that the opening is bounded by wall portions having guide surfaces formed therein for guiding said lever,
said lever is disposed substantially inside the receiving space,
said lever support comprises a sliding block arranged to be movable at least partly inside the receiving space, and
said further means for urging comprises a tension spring arranged adjacent the receiving space.

10. A device as claimed in claim 9, characterized in that said means for urging comprise a spring arranged around said pivot.

11. A method of moving a sliding cover of a cassette, comprising:
inserting the cassette into a receiving space of a device having a lever which is in a first position,
supporting said lever pivotably on a lever support,
during said inserting, contacting the cassette with said lever which is in the first position,
during further insertion of the cassette, pivoting said lever against an urging force to an equilibrium position, moving said lever support from a starting position toward a position corresponding to the lever equilibrium position, and causing a free end of the lever to move said cover from a closed position toward an open position, and
upon still further insertion of the cassette, abruptly pivoting said lever past said equilibrium position so that during the abrupt pivoting the lever is pivoted through a movement which is substantially larger than that corresponding to the movement of the cassette, which abrupt pivoting moves said cover into at least substantially said open position.

12. A method as claimed in claim 11, further comprising
moving said lever support into contact with the cassette after commencement of the abrupt pivoting of the lever, and
during yet further insertion of the cassette, moving said lever and lever support to an end position of the lever support.

13. A method as claimed in claim 12, characterized in that said lever support moves into said contact with the cassette during the abrupt pivoting of the lever.

* * * * *